(12) United States Patent
San Martin et al.

(10) Patent No.: US 10,553,927 B2
(45) Date of Patent: Feb. 4, 2020

(54) INDUCTIVE DOWNHOLE TOOL HAVING MULTILAYER TRANSMITTER AND RECEIVER AND RELATED METHODS

(75) Inventors: Luis E. San Martin, Houston, TX (US); Evan L. Davies, Spring, TX (US); Michael S. Bittar, Houston, TX (US)

(73) Assignee: HALLIBURTON ENERGY SERVICES, INC, Houston, TX (US)

( * ) Notice: Subject to any disclaimer, the term of this patent is extended or adjusted under 35 U.S.C. 154(b) by 95 days.

(21) Appl. No.: 13/499,739

(22) PCT Filed: Oct. 9, 2009

(86) PCT No.: PCT/US2009/060145
§ 371 (c)(1),
(2), (4) Date: Sep. 10, 2012

(87) PCT Pub. No.: WO2011/043778
PCT Pub. Date: Apr. 14, 2011

(65) Prior Publication Data
US 2012/0326825 A1    Dec. 27, 2012

(51) Int. Cl.
*H01F 27/28*     (2006.01)
*H01Q 1/04*      (2006.01)

(52) U.S. Cl.
CPC .................................... *H01Q 1/04* (2013.01)

(58) Field of Classification Search
CPC .......... H01F 27/38; H01F 30/04; H01F 38/10; H01F 37/00; H05B 41/2822
USPC ........ 336/170, 208, 222, 225, 231, 232, 138
See application file for complete search history.

(56) References Cited

U.S. PATENT DOCUMENTS

| 1,933,402 | A |   | 10/1933 | Wheeler et al. |
|-----------|---|---|---------|----------------|
| 3,209,114 | A |   | 9/1965  | Mcbrian et al. |
| 3,283,277 | A | * | 11/1966 | Hulm ................ H01F 6/02 29/599 |
| 3,376,533 | A | * | 4/1968  | Chass ................ 336/136 |
| 3,958,328 | A | * | 5/1976  | Lee ................... 29/605 |
| 4,549,130 | A | * | 10/1985 | Dobberstein ........ 323/308 |
| 4,806,928 | A |   | 2/1989  | Veneruso et al. |
| 5,038,107 | A | * | 8/1991  | Gianzero et al. ..... 324/339 |
| 5,426,845 | A | * | 6/1995  | Weideman ........... H01F 41/098 29/602.1 |

(Continued)

FOREIGN PATENT DOCUMENTS

WO    WO-2011043778 A1    4/2011

OTHER PUBLICATIONS

Dictionary.com [Retrieved on Nov. 30, 2009] Retrieved from the Internet: <URL:http://diclionary.reference.comlbrowse/periphery>, (Nov. 30, 2009).

(Continued)

*Primary Examiner* — Elvin G Enad
*Assistant Examiner* — Kazi S Hossain
(74) *Attorney, Agent, or Firm* — Gilliam IP PLLC

(57) ABSTRACT

A downhole tool including a transmitter coil assembly and a receiver coil assembly. The coil assembly includes at least one first coil having a first support member with a first single layer of wire wound therearound. The coil assembly further includes at least one second coil. The second coil includes a second support member having a second single layer of wire wound therearound. The first support member is disposed within the second support member, and the first single layer spaced apart from the second single wire by a distance of D.

17 Claims, 6 Drawing Sheets

(56) References Cited

U.S. PATENT DOCUMENTS

| | | | |
|---|---|---|---|
| 5,565,837 A * | 10/1996 | Godek et al. | 336/232 |
| 5,673,013 A * | 9/1997 | Moody et al. | 336/192 |
| 6,344,786 B1 * | 2/2002 | Chin | 336/198 |
| 6,794,875 B2 | 9/2004 | Strickland et al. | |
| 6,921,042 B1 * | 7/2005 | Goodzeit | H01F 7/202 |
| | | | 242/430 |
| 6,975,150 B2 | 12/2005 | Amini | |
| 7,038,457 B2 | 5/2006 | Chen et al. | |
| 7,864,019 B2 * | 1/2011 | Meinke et al. | 336/208 |
| 2004/0119657 A1 | 6/2004 | Mayer et al. | |
| 2007/0091009 A1 * | 4/2007 | Lueg-Althoff | H01F 5/02 |
| | | | 343/867 |
| 2008/0003936 A1 * | 1/2008 | Swedek et al. | 451/527 |
| 2010/0078171 A1 * | 4/2010 | Moody et al. | 166/285 |
| 2010/0148904 A1 * | 6/2010 | Xie | H01F 3/00 |
| | | | 336/90 |

OTHER PUBLICATIONS

"International Application Serial No. PCT/US09/60145, Search Report dated Dec. 9, 2009", 5 pgs.

"International Application Serial No. PCT/US09/60145, Written Opinion dated Dec. 9, 2009", 7 pgs.

"International Application Serial No. PCT/US2009/060145, International Preliminary Report on Patentability dated Feb. 21, 2012", 31 pgs.

"Great Britain Application Serial No, 1208212.9, Office Action dated Feb. 7, 2014", 2 pgs.

"Great Britain Application Serial No. 1208212.9, Reply filed Jul. 22, 2014 to Office Action dated Feb. 7, 2014", 10 pgs.

"International Application Serial No. PCT/US2009/060145, International Preliminary Report on Patentability dated Apr. 19, 2012", 9 pgs.

* cited by examiner

INDUCTIVE DOWNHOLE TOOL HAVING MULTILAYER TRANSMITTER AND RECEIVER AND RELATED METHODS

RELATED APPLICATIONS

This application is a U.S. National Stage Filing under 35 U.S.C. 371 from International Application No. PCT/US2009/060145, filed on Oct. 9, 2009, and published as WO 2011/043778 A1 on Apr. 14, 2011; which application and publication are incorporated herein by reference in their entirety.

TECHNICAL FIELD

The application relates generally to inductive well logging. In particular, the application relates to inductive well logging with a multilayer inductive logging tool.

BACKGROUND

During drilling operations for extraction of hydrocarbons, an accurate determination of a shape of a borehole is important. In particular, a number of other downhole measurements are sensitive to a stand-off of the downhole tools from the formation. Knowledge of the borehole shape may be required to apply corrections to these downhole measurements. A determination of the shape of the borehole has various other applications. For example, for completing a well, an accurate knowledge of the borehole shape is important in hole-volume calculations for cementing.

BRIEF DESCRIPTION OF THE DRAWINGS

The embodiments are provided by way of example and not limitation in the figures of the accompanying drawings, in which like references indicate similar elements and in which.

DETAILED DESCRIPTION

Methods; apparatus and systems for induction well logging are described. In the following description, numerous specific details are set forth. However, it is understood that embodiments of the invention may be practiced without these specific details. In other instances, well-known circuits, structures and techniques have not been shown in detail in order not to obscure the understanding of this description. Some embodiments may be used in Measurement While Drilling (MWD), Logging While Drilling (LWD) and wireline operations.

A method and system of using a downhole tool having an induction antenna coil on several layers of a support member such as a mandrel, which can be used to increase signal strength of small diameter tools. This further allows for additional coils to be used on the downhole tool with different orientations.

Figure 4A:
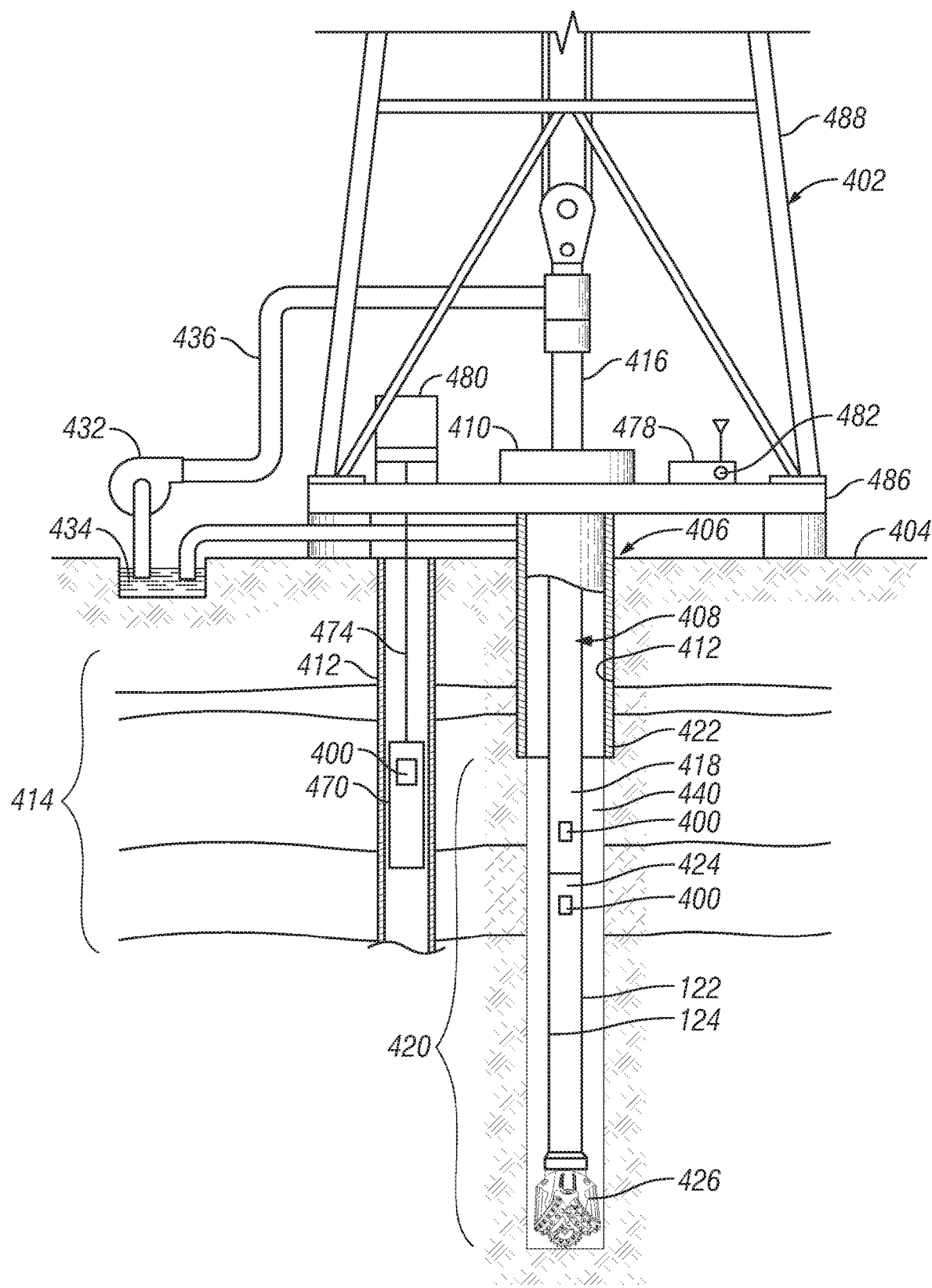
FIG. 4A illustrates a drilling well during Measurement While Drilling (MWD) operations, Logging While Drilling (LWD) operations or Surface Data Logging (SDL) operations, according to some embodiments.
Figure 4B:
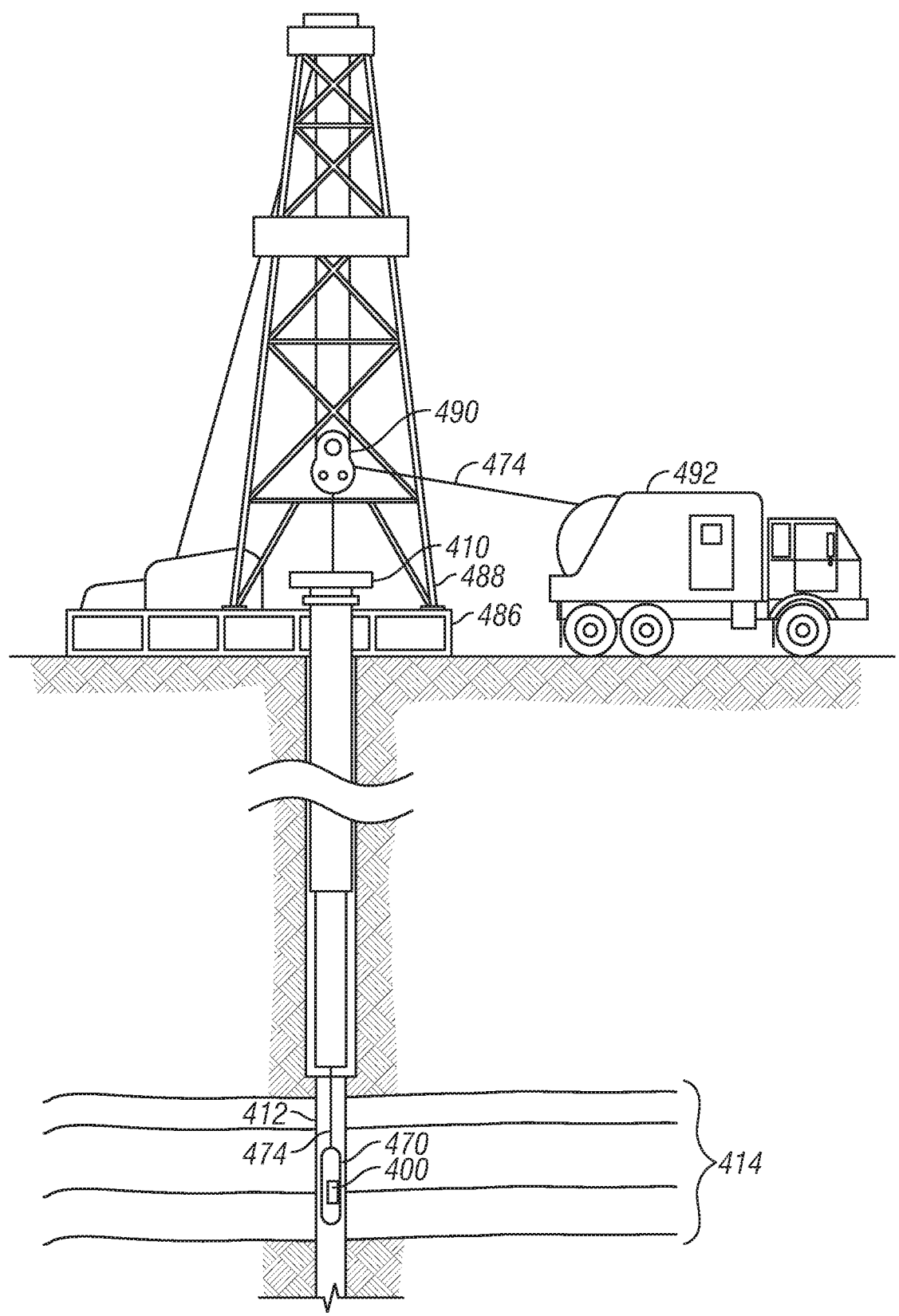
FIG. 4B illustrates a drilling well during wireline logging operations, according to some embodiments.

Examples of inductive downhole tools can be seen in FIGS. 4A and 4B. FIG. 4A illustrates a drilling well during Measurement While Drilling (MWD) operations, Logging While Drilling (LWD) operations or Surface Data Logging (SDL) operations, according to some embodiments. A system 464 may also form a portion of a drilling rig 402 located at a surface 404 of a well 406. The drilling rig 402 may provide support for a drill string 408. The drill string 408 may operate to penetrate a rotary table 410 for drilling a borehole 412 through subsurface formations 414. The drill string 408 may include a Kelly 416, drill pipe 418, and a bottom hole assembly 420, perhaps located at the lower portion of the drill pipe 418. The drill string 408 further includes one or more coils 120, including at least one transmitter coil 122 and/or at least one receiver coil 124, as further discussed below.

The bottom hole assembly 420 may include drill collars 422, a downhole tool 424, and a drill bit 426. The drill bit 426 may operate to create a borehole 412 by penetrating the surface 404 and subsurface formations 414. The downhole tool 424 may comprise any of a number of different types of tools including MWD (measurement while drilling) tools, LWD (logging while drilling) tools, and others.

During drilling operations, the drill string 408 (perhaps including the Kelly 416, the drill pipe 418, and the bottom hole assembly 420) may be rotated by the rotary table 410. In addition to, or alternatively, the bottom hole assembly 420 may also be rotated by a motor (e.g., a mud motor) that is located downhole. The drill collars 422 may be used to add weight to the drill bit 426. The drill collars 422 also may stiffen the bottom hole assembly 420 to allow the bottom hole assembly 420 to transfer the added weight to the drill bit 426, and in turn, assist the drill bit 426 in penetrating the surface 404 and subsurface formations 414.

During drilling operations, a mud pump 432 may pump drilling fluid (sometimes known by those of skill in the art as "drilling mud") from a mud pit 434 through a hose 436 into the drill pipe 418 and down to the drill bit 426. The drilling fluid can flow out from the drill bit 426 and be returned to the surface 404 through an annular area 440 between the drill pipe 418 and the sides of the borehole 412. The drilling fluid may then be returned to the mud pit 434, where such fluid is filtered. In some embodiments, the drilling fluid can be used to cool the drill bit 426, as well as to provide lubrication for the drill bit 426 during drilling operations. Additionally, the drilling fluid may be used to remove subsurface formation 414 cuttings created by operating the drill bit 426.

FIG. 4B illustrates a drilling well during wireline logging operations, according to some embodiments. A drilling platform 486 is equipped with a derrick 488 that supports a hoist 490. Drilling of oil and gas wells is commonly carried out by a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the tool body 470 is lowered to the bottom of the region of interest and subsequently pulled upward at a substantially constant speed. During the upward trip, instruments included in the tool body 470 may be used to perform measurements on the subsurface formations 414 adjacent the borehole 412 as they pass by. The measurement data can be communicated to a logging facility 492 for storage, processing, and analysis. The logging facility 492 may be provided with electronic equipment for various types of signal processing. Similar log data may be gathered and analyzed during drilling operations (e.g., during Logging While Drilling, or LWD operations). The wireline logging tool body 570 further includes one or more coils 120, including at least one transmitter coil 122 and at least one receiver coil 124, as further discussed below.

Figure 1:
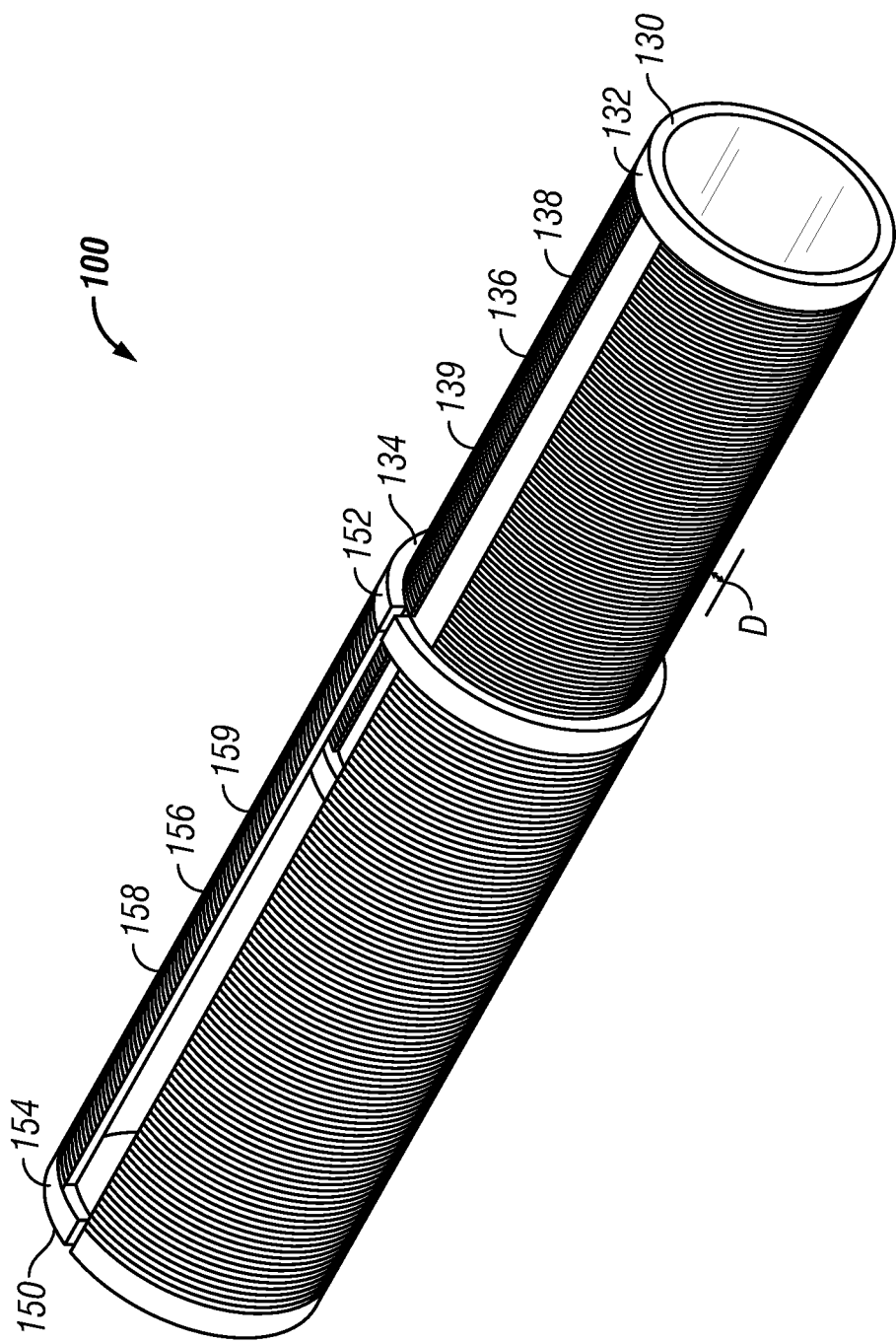
FIG. 1 illustrates a perspective view of an induction coil assembly, according to example embodiments.

FIG. 1 illustrates one example of the one or more coils 120 of a coil assembly 100, which shows a multi-layered assembly. In this initial discussion, an example of two layers are shown, however, additional layers can be used as well. For instance, in an option, 2-4 layers of wire can be used. In another option 2-10 layers can be used. The layers can be spaced apart and placed in different orientations. This assists in reducing self capacitance of the antennas and allows for additional winding around the support members or mandrels.

In an option, a first support member 130 is provided and extends from a first end portion 132 to a second end portion 134. The support member(s) can be made from ceramic material, fiberglass, a ceramic coated with rubber, or a combination thereof. The first support member 130 further includes a first single layer of wire 136 therearound, which in one option, operates as a transmitter coil 122 or a receiver coil 124. In an option, the first support member 130 includes one or more grooves 138 therein. The one or more grooves 138 in an option follow a helical path around the outer periphery of the first support member 130, and the wire 136 is received within the one or more grooves 138. The first support member 130 is generally cylindrical in shape, in an option, and is sized to be received within a second support member 150. In a further option, a coating 139 is disposed over the wire 136, which protects the wire after it is wound around the first support member 130 or disposed within grooves 138 of the first support member.

In an option, the second support member 150 is provided and extends from a first end portion 152 to a second end portion 154. The second support member 150 further includes a second single layer of wire 156 therearound, which operates as a receiver coil 124 or a transmitter coil. In another option, the second single layer of wire 156 is electrically coupled with the first single layer of wire 136 to form a single antenna. For instance, the first coil and the second coil are electrically coupled and form a single antenna.

In an option, the second support member 150 includes one or more grooves 158 therein. The one or more grooves 158 in an option follow a helical path around the outer periphery of the second support member 150, and the wire 156 is received within the one or more grooves 158. The second support member 150 is generally cylindrical in shape, in an option, and is sized to receive the first support member 130 within an interior portion of the second support member 150. In a further option, a coating 159 is disposed over the wire 156.

The first support member 130 is disposed within the second support member 150. The second support member 150 has a thickness D which allows for the wire 156 of the receiver, or the transmitter, or another coil, to be spaced from the wire 136 of the transmitter by the distance D. In an option, the distance D is equal to or greater than 0.1 inches (2.54 mm). In another option, the distance D is about 0.125 inches (3.175 mm). In an option, the wire 136 is wound generally parallel with the wire 156. In another option, the wire 136 is wound such that it is orthogonal with the wire 156. In a further option, the coil formed by the second layer of wire 156 and the coil formed by the first layer of wire 136 are concentric. The coil assembly 100 can be incorporated in the various downhole tools, including the tools discussed above, such as, but not limited to, a wireline tool or a drill string, or NMR tools. In another option, the coil assembly can be in a casing and placed permanently in a field.

Figure 2:
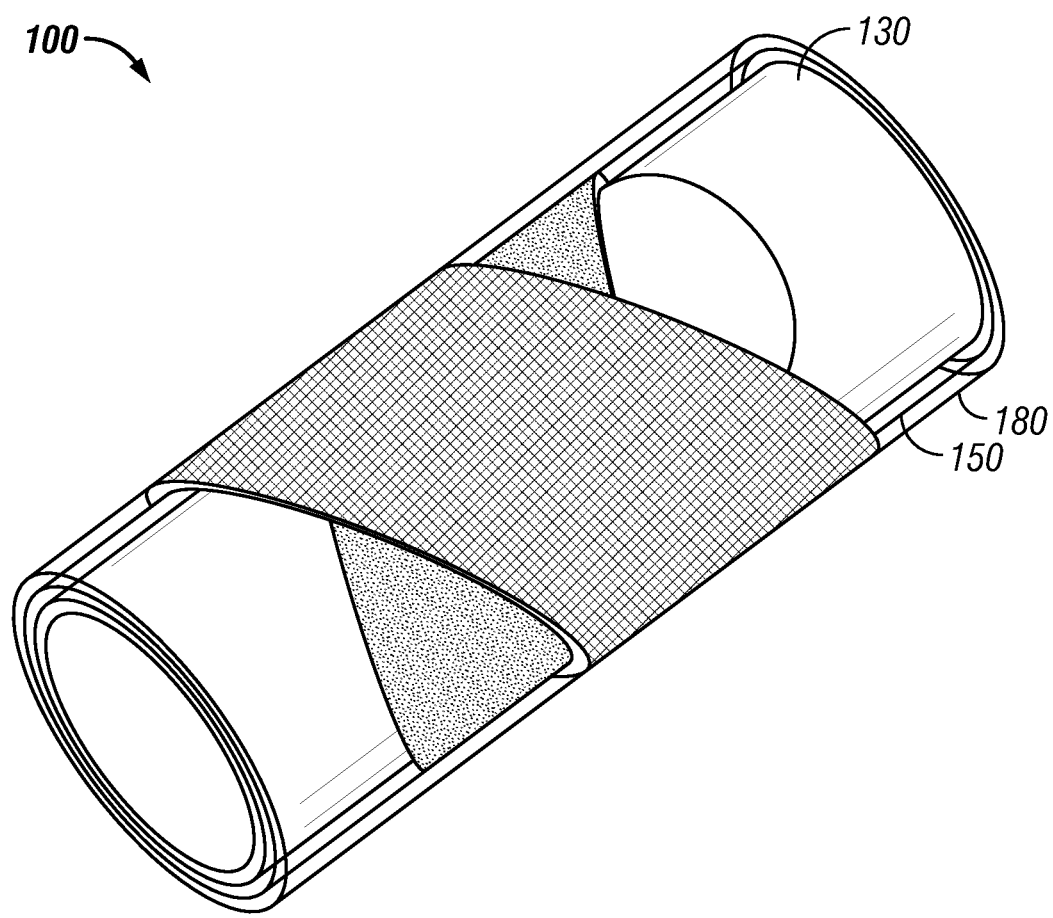
FIG. 2 illustrates a perspective view of an induction coil assembly, according to other example embodiments.
Figure 3:
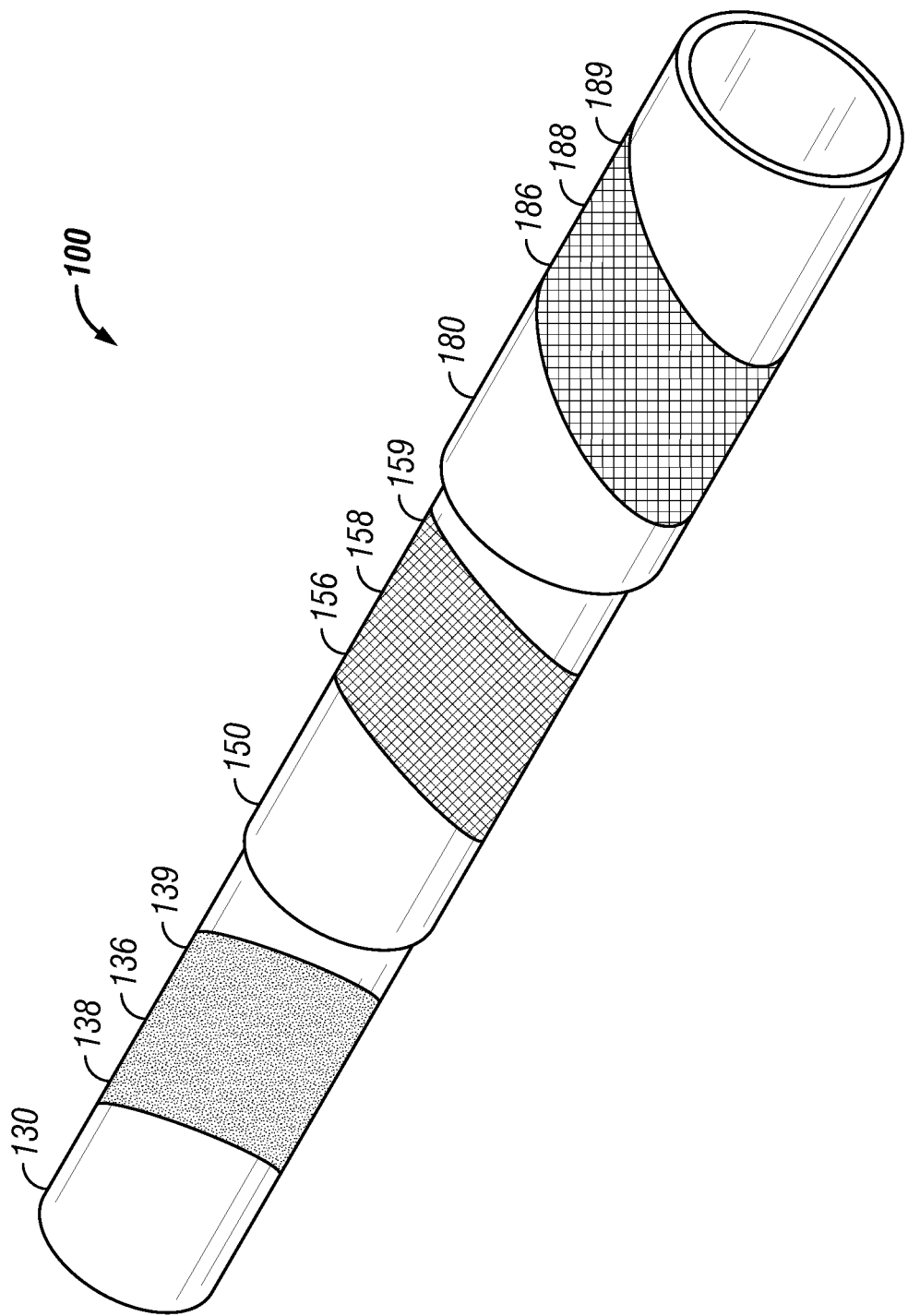
FIG. 3 illustrates an exploded perspective view of the coil assembly of FIG. 2.

FIGS. 2 and 3 illustrate another embodiment, where FIG. 3 illustrates an exploded perspective view of FIG. 2. A coil assembly 100 includes a first support member 130 and a second support member 150 as discussed above. The first support member 130 further includes a first single layer of wire 136 therearound, which operates as a transmitter coil 122 or a receiver coil 124 (FIGS. 4A, 4B). In an option, the first support member 130 includes one or more grooves 138 therein. The one or more grooves 138 in an option follow a helical path around the outer periphery of the first support member 130, and the wire 136 is received within the one or more grooves 138. The first support member 130 is generally cylindrical in shape, in an option, and is sized to be received within a second support member 150. In a further option, a coating 139 is disposed over the wire 136, which protects the wire after it is wound around the first support member 130 or disposed within grooves 138 of the first support member.

The second support member 150 further includes a second single layer of wire 156 therearound, which operates as a transmitter coil 122 or a receiver coil 124 (FIGS. 4A, 4B). The second single layer of wire 156, in an option, is wrapped diagonally around the second support member 150 such that it is orthogonal to the first wire 136, which is diagonally wrapped around the first support. In an option, the second support member 150 includes one or more grooves 158 therein. The one or more grooves 158 in an option follow a helical path around the outer periphery of the second support member 150, and the wire 156 is received within the one or more grooves 158. The second support member 150 is generally cylindrical in shape, in an option, and is sized to receive the first support member 130 within an interior portion of the second support member 150. In a further option, a coating 159 is disposed over the wire 156.

In a further option, a third support member 180 further includes a third single layer of wire 186 therearound, which operates as a second receiver coil 124. In an option, the wire 186 is wrapped around the third support member 180 such that it is orthogonal to the second layer of wire 156. In an option, the third support member 180 includes one or more grooves 188 therein. The one or more grooves 188 in an option follow a helical path around the outer periphery of the third support member 180, and the wire 186 is received within the one or more grooves 188. The third support member 180 is generally cylindrical in shape, in an option, and is sized to receive the second support member 150 within an interior portion of the third support member 180. In a further option, a coating 189 is disposed over the wire 186.

The first support member 130 is disposed within the second support member 150, and the second support member 150 is disposed within the third support member 180. The second support member 150 and the third support member 180 have a thickness D which allows for the wire 156 of the receiver coils, or transmitter coils, or another coil, to be spaced from the wire 136 by the distance D, and allows for the wire 186 to be spaced from the wire 156. In an option, the distance D is equal to or greater than 0.1 inches (2.54 mm). In an option, the wire 136 is wound generally orthogonal with the wire 156. In a further option, wire 186 is generally orthogonal with wire 156. The wire 136, 156, 186 can be electrically isolated from one another. The coil assembly can be incorporated in the various downhole tools, include the tools discussed above, such as, but not limited to, a wireline tool or a drill string.

Figure 5:
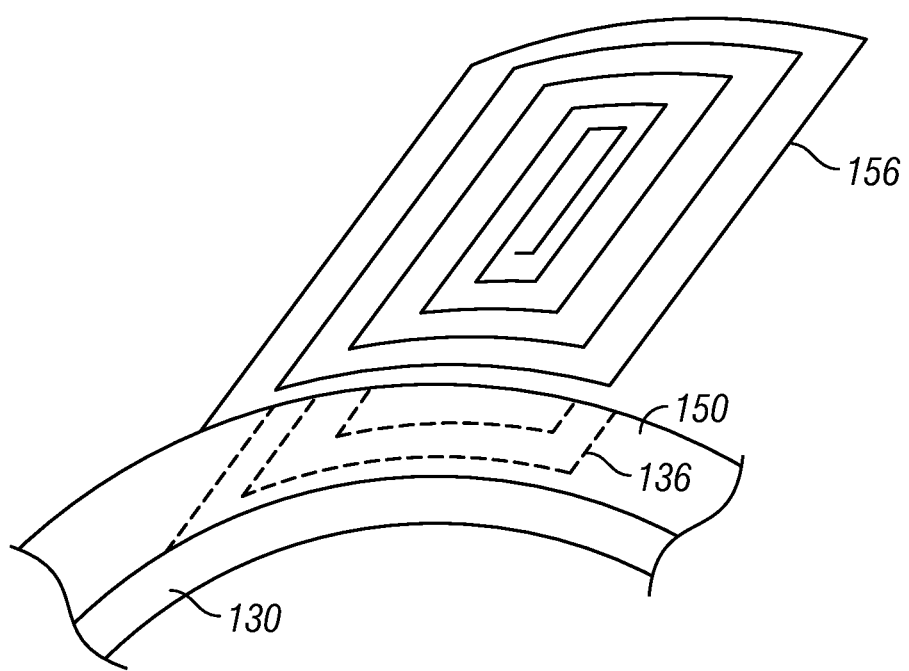
FIG. 5 illustrates a portion of an induction coil assembly, according to other example embodiments.

FIG. 5 illustrates another option for the induction coil assembly. In an option, the second support member 150 includes a layer of wire 156 which only partially covers a surface of the support member 150 outer periphery. In an option, the layer of wire 156 is a single layer of wire and optionally is coiled as shown in FIG. 5. The first support member 130 includes a layer of wire 136, such as a single layer of wire, which in an option covers a portion of the surface of the support member 130 outer periphery. In an option, the wire 136 is disposed in a pattern similar to the layer of wire 156 as shown in FIG. 5, such as in a coiled configuration. In an option, the wire 136 is disposed below wire 156. In another option, the wire 136 is only partially below wire 156. In yet another option, the wire 136 is rotated relative to wire 156 such that wire 136 is not directly below wire 156. Wires 136, 156 may be communicatively coupled together, or may form separate members.

A system includes a downhole tool including at least one transmitter coil and at least one receiver coil, including the coil assemblies discussed herein. Both transmitter coils and receiver coils are wound around support members having an axis that is generally aligned with a longitudinal axis of the downhole tool. The at least one transmitter coil and the at least one receiver coil are longitudinally positioned along the axis of the downhole tool.

During operation, an oscillator supplies alternating current with a predetermined frequency to the transmitter coils, thereby inducing voltage in the receiver coils. The voltage induced in the receiver coils results from the sum of all eddy currents induced in the surrounding formations by all transmitters. Phase sensitive electronics measure the receiver voltage that is in-phase with the transmitter current divided by magnitude of the transmitter current. When normalized with the proper scale factor, this gives the apparent conductivity of the formation.

In a further option, a method includes forming a coil assembly, such as a transmitter coil or a receiver coil, including wrapping a first support member with a first wire and forming a single layer of wire around the first support member, and wrapping a second support member with a second wire and forming a single layer of wire around the second support member. Optionally, the second wire is wrapped orthogonally relative to the first wire. The method further includes disposing the first support member within the second support member and forming the coil assembly, and electrically coupling the wire with a processor. Optionally, a coating is disposed over the wire of the first support member and/or the second support member. In another option, a sleeve of material is disposed over the wire of the first support member and/or the second support member.

Several options for the method are as follows. For instance, in an option, wrapping the wire around the first support member includes wrapping the first wire within a groove of the first support member. In another option, wrapping the wire around the second support member includes wrapping the second wire within a groove of the second support member. In yet another option, the method further includes wrapping a third wire over a third support member, and optionally the third wire is orthogonal to the second wire.

The method can be implemented in various types of downhole tools. For instance, the method further includes disposing the coil assembly in a drill string. Alternatively, the method further includes disposing the coil assembly in a wireline tool.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In view of the wide variety of permutations to the embodiments described herein, this detailed description is intended to be illustrative only; and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

What is claimed is:

1. A downhole measurement apparatus comprising:
a drill string configured to drill a borehole; and
a downhole electromagnetic measurement (EM) tool within said drill string, said downhole EM tool including,
at least one first coil configured as a transmitter antenna or a receiver antenna and including a first support member having a first single layer of wire extending along at least a portion of an outer periphery of the first support member, wherein the first support member includes a groove on a helical path therein, the groove adapted to receive the first single layer of wire; and
at least one second coil configured as a transmitter antenna or a receiver antenna and including a second support member having a second single layer of wire extending along at least a portion of an outer periphery of the second support member, wherein the first support member is disposed within the second support member, wherein the first single layer is coaxial with and spaced apart from the second single layer by at least 2.54 millimeters, and wherein the first single layer of wire is wrapped diagonally around the first support member and wherein the second single layer is wrapped diagonally around the second support member orthogonally to the first single layer of wire.

2. The downhole measurement apparatus of claim 1, wherein the at least one first coil and the at least one second coil are wound around the outer periphery of the first and second support members, respectively.

3. The downhole measurement apparatus of claim 1, wherein at least one of the at least one first coil and the at least one second coil are wound on a helical path.

4. The downhole measurement apparatus of claim 1, wherein the second support member includes a groove on a helical path therein, the groove adapted to receive the second single layer of wire therein.

5. The downhole measurement apparatus of claim 1, further comprising:
a third single layer of wire wound over a third support member, the first support member and the second support member being disposed within the third support member and the third single layer is wrapped in a direction that is different than a direction the second single layer of wire is wrapped.

6. A downhole measurement system comprising:
a wireline extendable into a borehole;
a downhole tool attached to said wireline, said downhole tool including:
at least one first coil configured as a transmitter antenna or a receiver antenna and including a first support member having a first single layer of wire wound diagonally therearound, wherein the first support member includes a groove on a helical path therein, the groove adapted to receive the first single layer of wire, and wherein the at least one first coil is operated as an induction transmitter; and
at least one second coil configured as a transmitter antenna or a receiver antenna and including a second support member having a second single layer of wire wound diagonally therearound orthogonal to the first single layer of wire, wherein the first support member is disposed within the second support member, wherein the first single layer of wire is coaxial with and spaced apart from the second single layer of wire by at least 2.54 millimeters.

7. The downhole measurement system of claim 6, wherein the second support member includes a groove on a helical path therein, the groove adapted to receive the second single layer of wire therein.

8. The downhole measurement system of claim 6, further comprising: a third single layer of wire wound over a third support member.

9. The downhole measurement system of claim 6, wherein at least one of the first support member or the second support member comprises a mandrel associated with the downhole tool.

10. A method for performing downhole measurements, said method comprising:
driving at least one first coil as a transmitter using an oscillator to induce eddy currents in a surrounding formation downhole, the at least one first coil including a first support member having a first single layer of wire extending along at least a portion of an outer periphery of the first support member, wherein the first support member includes a groove on a helical path therein, the groove adapted to receive the first single layer of wire; and
sensing the eddy currents in the surrounding formation downhole by at least one second coil, wherein the at least one second coil including a second support member having a second single layer of wire extending along at least a portion of an outer periphery of the second support member, wherein the first support member is disposed within the second support member, wherein the first single layer is coaxial with and spaced apart from the second single layer by at least 2.54 millimeters, and wherein the first single layer of wire is wrapped diagonally around the first support member and therein the second single layer is wrapped diagonally around the second support member orthogonally to the first single layer of wire.

11. The method of claim 10, further comprising:
sensing the eddy currents while a coil assembly comprising the at least one first coil and the at least one second coil are disposed in a drill string.

12. The method of claim 10, further comprising:
sensing the eddy currents while a coil assembly comprising the at least one first coil and the at least one second coil are disposed in a wireline tool.

13. The method of claim 10, further comprising:
driving the oscillator such that alternating current is supplied with a predetermined frequency to the at least one first coil; and
determining apparent conductivity of the formation based on measuring voltage from the at least one second coil that is in-phase with the alternating current using phase sensitive electronics.

14. The downhole measurement system of claim 6, further comprising a protective coating disposed over the first single layer of wire.

15. The downhole measurement system of claim 6, wherein the first support member and the second support member include a ceramic material, fiberglass, a ceramic coated with rubber, or a combination thereof.

16. The downhole measurement apparatus of claim 1, wherein the first and second single layers of wire are arranged as one or more transmitter antennas to induce eddy currents in a surrounding formation downhole when driven by an oscillator or arranged as one or more receiver antennas that senses eddy currents induced in a surrounding formation downhole.

17. The downhole measurement system of claim 6, wherein the first and second single layers of wire are arranged as one or more transmitter antennas to induce eddy currents in a surrounding formation downhole when driven by an oscillator or arranged as one or more receiver antennas that senses eddy currents induced in a surrounding formation downhole.

* * * * *